United States Patent
DeLuca et al.

(10) Patent No.: US 7,392,485 B2
(45) Date of Patent: Jun. 24, 2008

(54) SYSTEM AND METHOD FOR PROVIDING A SERVER CONTROL INTERFACE

(75) Inventors: Steve A. DeLuca, Woodinville, WA (US); Paul B. Darcy, Redmond, WA (US); Casey L. Kiernan, Kirkland, WA (US); Sally J. Martin, Redmond, WA (US); Juhan Lee, Issaquah, WA (US); Kevin A. Hodge, Bellevue, WA (US); Jeffrey P. Snover, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 419 days.

(21) Appl. No.: 09/824,484

(22) Filed: Mar. 30, 2001

(65) Prior Publication Data

US 2002/0140743 A1   Oct. 3, 2002

(51) Int. Cl.
G06F 3/00 (2006.01)
G06F 15/16 (2006.01)
G06F 15/173 (2006.01)

(52) U.S. Cl. ............... 715/763; 715/733; 715/765; 715/769; 715/736; 709/203; 709/223

(58) Field of Classification Search ........... 345/733, 345/734, 762–764, 771, 810, 835, 846; 709/201, 709/203, 223, 224; 715/733, 734, 736, 762, 715/763, 764, 769, 771, 781, 810, 835, 837, 715/846, 853; 702/127, 182, 188, 189; 719/315, 719/316
See application file for complete search history.

(56) References Cited

U.S. PATENT DOCUMENTS

| 5,252,951 | A |   | 10/1993 | Tannenbaum |   |
|---|---|---|---|---|---|
| 5,367,624 | A |   | 11/1994 | Cooper |   |
| 5,623,592 | A | * | 4/1997 | Carlson et al. | 345/866 |
| 5,742,286 | A |   | 4/1998 | Kung |   |
| 5,774,120 | A | * | 6/1998 | Goddard et al. | 715/845 |
| 5,815,152 | A | * | 9/1998 | Collier et al. | 345/839 |
| 5,821,937 | A | * | 10/1998 | Tonelli et al. | 345/853 |
| 5,896,491 | A | * | 4/1999 | Englefield | 715/839 |
| 6,008,811 | A | * | 12/1999 | McMillan | 715/769 |
| 6,061,512 | A | * | 5/2000 | Lin et al. | 717/168 |
| 6,128,016 | A | * | 10/2000 | Coelho et al. | 715/808 |

(Continued)

FOREIGN PATENT DOCUMENTS

JP   11195068   *   7/1999

*Primary Examiner*—X. L Bautista
(74) *Attorney, Agent, or Firm*—Christensen O'Connor Johnson Kindness PLLC

(57) ABSTRACT

A method and system for providing a computing device control interface are provided. A system administrator accesses a graphical user interface and selects a group of actions that are to be executed by a number of computing devices. The actions selected by the system administrator are embodied in a graphical action icon and displayed on the graphical user interface. The system administrator initiates the actions by manipulating the action icon such that it overlaps a computer icon, which embodies one or more computing devices within the network that will execute the selected actions. The computing device icon is also displayed on the user interface. The user interface executes the selected action on the selected computer and then generates an archive file embodying the execution of the selected actions on the selected group of computing devices.

20 Claims, 9 Drawing Sheets

U.S. PATENT DOCUMENTS

| | | | |
|---|---|---|---|
| 6,195,689 B1 | 2/2001 | Bahlmann | |
| 6,281,900 B1* | 8/2001 | Ishikawa | 345/853 |
| 6,353,446 B1* | 3/2002 | Vaughn et al. | 345/733 |
| 6,388,683 B1* | 5/2002 | Ishai et al. | 715/765 |
| 6,664,978 B1* | 12/2003 | Kekic et al. | 345/733 |
| 6,983,317 B1* | 1/2006 | Bishop et al. | 709/223 |
| 7,020,697 B1* | 3/2006 | Goodman et al. | 709/223 |
| 2002/0047863 A1* | 4/2002 | Hyman | 345/744 |
| 2002/0057292 A1* | 5/2002 | Holtz | 345/769 |
| 2002/0080174 A1* | 6/2002 | Kodosky et al. | 345/762 |
| 2002/0091739 A1* | 7/2002 | Ferlitsch et al. | 707/526 |
| 2002/0099818 A1* | 7/2002 | Russell et al. | 709/224 |
| 2003/0197733 A1* | 10/2003 | Beauchamp et al. | 345/764 |
| 2005/0021713 A1* | 1/2005 | Dugan et al. | 709/223 |
| 2005/0198247 A1* | 9/2005 | Perry et al. | 709/223 |
| 2006/0041660 A1* | 2/2006 | Bishop et al. | 709/224 |
| 2006/0070080 A1* | 3/2006 | Takahashi et al. | 719/315 |
| 2007/0033279 A1* | 2/2007 | Battat et al. | 709/224 |

* cited by examiner

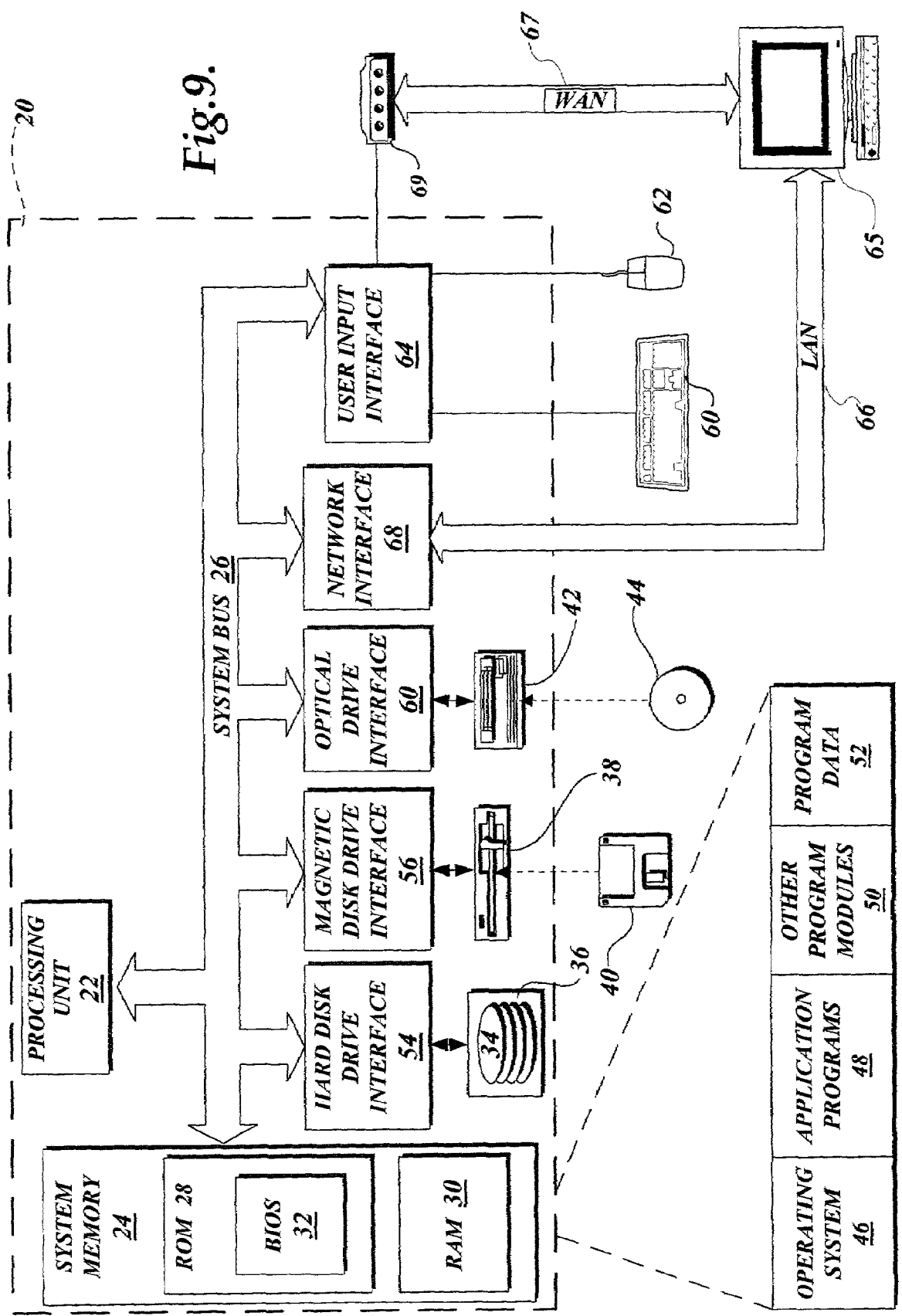

SYSTEM AND METHOD FOR PROVIDING A SERVER CONTROL INTERFACE

FIELD OF THE INVENTION

In general, the present application relates to computer software, and in particular, to a system and method for controlling a number of servers by manipulating a common interface.

BACKGROUND OF THE INVENTION

Generally described, computer networks can include a collection of a number of computers, such as server computer systems, to perform various functions. In one application, a large computer network can include more than one thousand networked server computers. Such a computer network is generally referred to as an enterprise network.

In some typical enterprise networks, several of the server computer systems may be remote from one another. For example, a corporation may maintain an enterprise network in which a set of server computer systems are located in North America, a set of server computer systems are located in Asia and another set of server computer systems are located in Europe. In one aspect, a system administrator can manage each individual server computer by utilizing an attached display and keyboard/mouse. However, as will be easily understood by one skilled in the relevant art, managing an enterprise network by individually manipulating each server is extremely inefficient, if not impossible. For example, it would be very difficult for a single system administrator to implement a simultaneous change requiring a manipulation of each server's input devices on all multiple server computers within an enterprise network, especially if the server computers were remote from one another.

To mitigate the need for individually manipulating each individual server computer, some enterprise networks utilize a centralized control to remotely manage each individual server in the enterprise network. For example, some enterprise networks utilize a graphical control in which individual servers are managed by manipulating a graphical user interface ("GUI"). In such an embodiment, each server is represented as individual graphical icons within the GUI. Accordingly, the individual server icon may be selected by the system administrator to display various server properties and/or to allow the system administrator to manage the server from the centralized control.

While a common user interface facilitates centralized control of a group of servers, the conventional approach remains deficient for situations in which a common action is to be implemented in a number of servers within the enterprise network. For example, a system administrator may wish to initialize one or more capacity planning measures in each of the database servers within an enterprise network. In the conventional centralized control GUI, the system administrator would then have to individually select each of the database servers and then issue and activate the measurement through the centralized user interface. Additionally, if the system administrator would want to slightly modify the measurement or repeat the same set of capacity planning measurement at a different time, the entire initialization process may have to be repeated for each of the servers. Accordingly, this deficiency is further accentuated for larger scale enterprise networks.

Thus, there is a need for a system and method for implementing a server control interface that allows and facilitates the implementation of common tasks across a server or group of servers.

SUMMARY OF THE INVENTION

A method and system for providing a computing device control interface are provided. A system administrator accesses a graphical user interface and selects a group of actions that are to be executed by a number of computing devices. The actions selected by the system administrator are embodied in a graphical action icon and displayed on the graphical user interface. The system administrator initiates the actions by manipulating the action icon such that it overlaps a computer icon, which embodies one or more computing devices within the network that will execute the selected actions. The computing device icon is also displayed on the user interface. The user interface executes the selected action on the selected computer and then generates an archive file embodying the execution of the selected actions on the selected group of computing devices.

In an aspect of the present invention, a method of providing a computing device control interface is provided. The computing device control interface displays a set of graphical action icons for selection by a user. Each action icon is representative of one or more actions to be executed by a computing device. The computing device interface displays a set of graphical computing device icons. Each graphical icon is representative of one or more computing devices. The computing device control interface obtains a selection of an action icon and a selection of a computing device icon. The computing device control interface then instructs each computing device represented by the selected computing device icon to execute the instructions represented by the selected action icon.

In another aspect of the present invention, a method of providing a computing device control interface in a computer system having a display and at least one graphical user interface selection device is provided. The computer system obtains an identification of a group of actions to be executed by a computing device and displays the group of action as an action icon on the display. The computer system obtains an identification of a group of computing devices to be controlled and displays the group of servers as a computing device icon on the display. The computer system obtains a selection of the action icon by the selection device and instructs each computing device represented by the computing device icon to execute the groups of actions represented by the action upon a selection of the computing device icon with the user interface device.

In a further aspect of the present invention, a method for providing a computing device control interface in a computer system having a display and graphical user interface selection device is provided. The computer system obtains an identification of a number of actions to be executed by a computing device and displays the number of actions on the display screen. The computer system obtains a selection of one or more of a set of the actions by the user interface selection device and generates a graphical icon corresponding to the set of actions selected by the user interface selection device. The computer system displays the graphical icon on the display screen.

In yet another aspect of the present invention, a computer-readable medium having computer-executable components for providing a computing device control interface is provided. The computer-readable medium includes an action icon creating component for creating an action icon corresponding to a number of user selected actions. The computer-readable medium also includes a server icon component for creating a computing device icon corresponding to a number of computing devices that will execute the number of user selected actions corresponding to a selected action icon.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 9 is a block diagram of a computer system environment suitable for implementation in the present invention.

DETAILED DESCRIPTION OF THE PREFERRED EMBODIMENT

Figure 1:
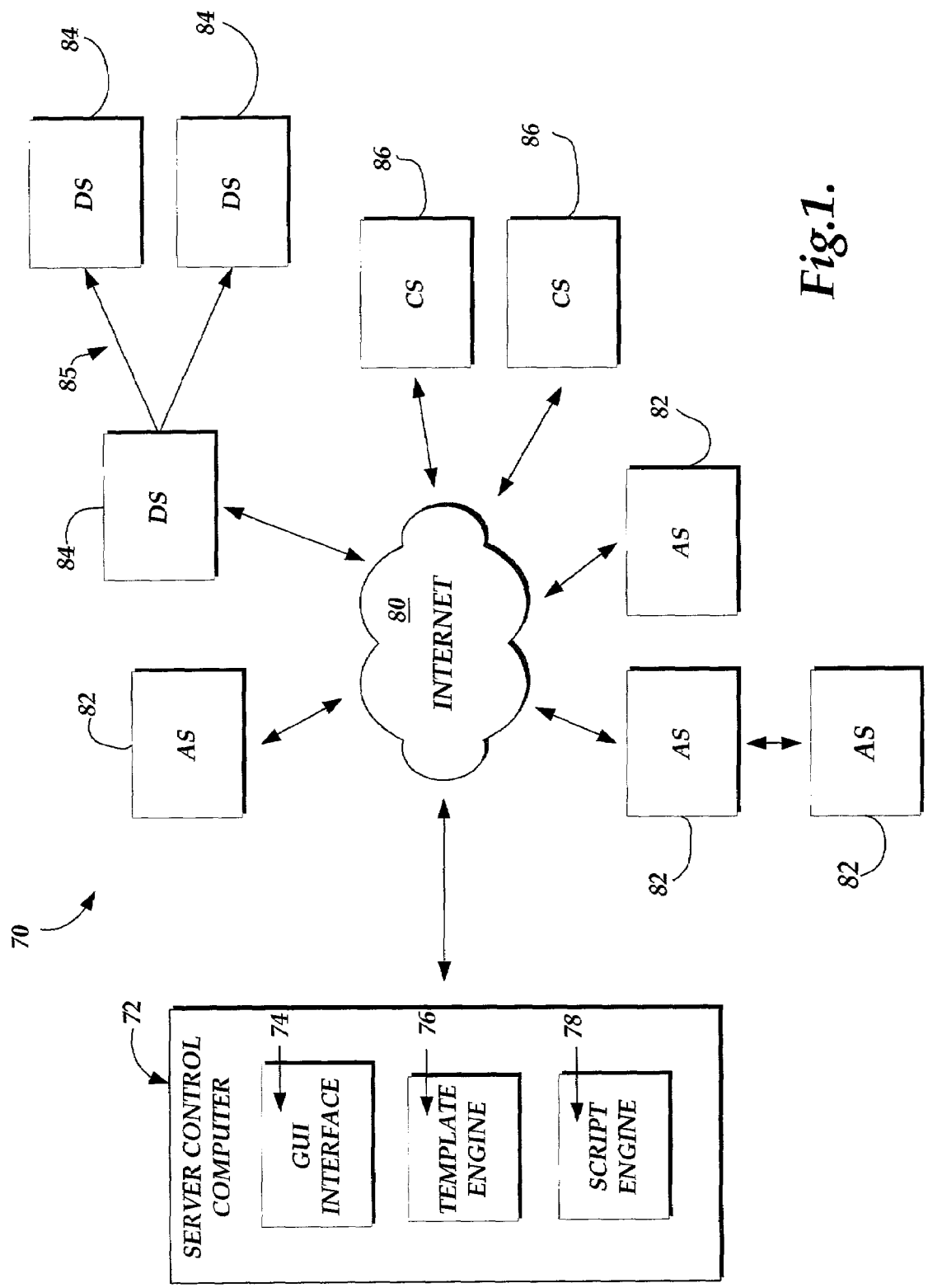
FIG. 1 is a block diagram illustrative of an enterprise network implementing a common server control user interface in accordance with the present invention.

FIG. 9 illustrates an example of a suitable computing system environment in which the invention may be implemented. The computing system environment is only one example of a suitable computing environment and is not intended to suggest any limitation as to the scope of use or functionality of the invention. Neither should the computing environment be interpreted as having any dependency requirement relating to any one or combination of components illustrated in the exemplary operating environment.

The invention is operational in numerous other general purpose or special computing system environments or configurations. Examples of well known computing systems, environments, and/or configurations that may be suitable for implementing the invention include, but are not limited to, personal computers, server computers, laptop devices, multiprocessor systems, microprocessor-based systems, network PCs, minicomputers, mainframe computers, distributed computing environments that include any of the above systems, or the like. Additional examples of other well known computing systems operational with the present invention include handheld devices, wireless devices, and/or mobile devices. Moreover, the present invention may also be operational in a variety of non-traditional computing devices having a computing and communication interface such as household products (e.g., washing machines, television, refrigerators), business products, fixtures (e.g., lights, security systems), and the like.

The invention may be described in the general context of computer-executable instructions, such as program modules, being executed by a computer. Generally, program modules include routines, programs, objects, components, data structures, etc. that perform a particular task or implement particular abstract data types. The invention may be also practiced in distributed computing environments where tasks are performed by remote processing devices that are linked through a communications network. In a distributed computing environment, program modules may be located in both local and remote computer storage media, including memory storage devices.

With reference to FIG. 9, an exemplary system for implementing the invention includes a general purpose-computing device in the form of a computer 20. Components of a computer 20 include, but are not limited to, a processing unit 22, a system memory 24, and a system bus 26 that couples various system components, including the system memory, to the processor. The system bus may be any of several types of bus structures including a memory bus or memory controller, peripheral bus, and a local bus using any of a variety of bus architectures. By way of example, not limitation, such architectures include Industry Standard Architecture (ISA) normal capitalization bus, Micro Channel Architecture (MCA) bus, Enhanced ISA (EISA) bus, Video Electronics Standards Association (VESA) local bus, and Peripheral Component Interconnect (PCI) bus also known as a Mezzanine bus.

The computer 20 typically includes a variety of computer-readable media. Computer-readable media can be any available media that can be accessed by the computer 20 and includes both volatile and non-volatile media, removable and non-removable media. By way of example, and not limitation, computer-readable media may comprise computer storage media and communication media. Computer storage media includes, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which can be used to store the desired information and which can be accessed by the computer 20.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 24 includes computer storage media in the form of volatile and/or non-volatile memory such as read only memory (ROM) 28 and random access memory (RAM) 30. A basic input/output system 32 (BIOS), containing the basic routines that help to transfer information between elements within the computer 20, such as during start-up, is typically stored in ROM 28. RAM 30 typically contains data and/or program modules that are immediately accessible to and/or presently being operated on by the processing unit 22. By way of example, and not limitation, FIG. 9 illustrates an operating system 46, application programs 48, other program modules 50, and program data 52.

The computer 20 may also include removable/non-removable, volatile/nonvolatile computer storage media. By way of example only, FIG. 9 illustrates a hard disk drive 36 that reads from or writes to non-removable, non-volatile magnetic media 38, a magnetic drive 38 that reads from or writes to a removable, non-volatile magnetic disk 40, and an optical disk drive 42 that reads from or writes to a removable, non-volatile optical disk 44, such as CD-ROM or other optical media. Other removable/non-removable, volatile/non-volatile computer storage media that can be used in the exemplary operating environment include, but are not limited to, magnetic tape cassettes, flash memory cards, DVD, digital video tape, Bernoulli cap cartridges, solid state RAM, solid state ROM, and the like. The hard disk drive 34, magnetic disk drive 38, and optical disk drive 42 may be connected to the system bus 26 by a hard disk drive interface 54, a magnetic disk drive interface 56, and an optical drive interface 58, respectively. Alternatively, the hard disk drive 34, magnetic disk drive 38, and optical disk drive 42 are typically connected to the system bus 26 by a Small Computer System Interface (SCSI).

The drives and their associated computer storage media discussed above and illustrated in FIG. 9, provide storage of computer-readable instructions, data structures, program modules and other data for the computer 20. In FIG. 9, for example, the hard disk drive 34 is illustrated as storing the operating system 46, application programs 48, other programs 50, and program data 52. Note that these components can either be the same as or different from the operating system 46, the other program modules 50, and the program data 52. A user may enter commands and information into the computer 20 through input devices such as a keyboard 60 and a pointing device 62, commonly referred to as a mouse, track ball or touch pad. Other input devices (not shown) may include a microphone, a joystick, a game pad, a satellite dish, a scanner, or the like. These and other input devices are often connected to the processing unit 22 through user input interface 64 and may be connected by other interface and bus structures, such as a parallel port, game port or other universal serial bus (USB).

The computer 20 may operate in a network environment using logical connections to one or more remote computers 65. The remote computer 65 may be a personal computer, a server, a router, a network PC, a peer device or other common network node, and typically includes many or all of the elements described above relative to the computer 20, although only a memory storage device has been illustrated in FIG. 9. The logical connections depicted in FIG. 9 include a local area network (LAN) 66 and a wide area network (WAN) 67, but also include other networks. Such network environments are commonplace in office, enterprise-wide computer networks, intranets, and the Internet. It will be appreciated by one skilled in the relevant art that the computer 20 may be configured such that at least one network connection is non-continuous. Accordingly, the computer 20 would be unable to communicate with the remote computer 65 throughout a period of time that the network connection is disabled. Such a configuration is described generally as an "off-line" configuration.

When used in a LAN network environment, the computer 20 is connected to the LAN 66 through a network interface adapter 68. When used in a WAN network environment, the computer typically includes a modem or other means for establishing communications over the WAN 68, such as the Internet. The modem, which may be internal or external, may be connected to the system bus 26 via the serial port interface or other appropriate mechanism. In a networked environment, program modules depicted relative to the computer 20, or portions thereof, may be stored in the remote memory storage device. By way of example, and not limitation, FIG. 9 illustrates remote application programs 48 as residing on memory device 24. It will be appreciated that the network connections shown are exemplary and other means of establishing communication between the computers may be used. Although many other internal components of the computer 20 are not shown, those of ordinary skill will appreciate that such components and their interconnection are well known. Accordingly, additional details concerning the internal construction of the computer 20 need not be disclosed in connection with the present invention.

Those skilled in the art will understand that program modules such as the operating system 46, the application programs 48 and data 52 are provided to the computer 20 via one of its memory storage devices, which may include ROM 28, RAM 30, hard disk drive 34, magnetic disk drive 38, or optical disk device 42. The hard disk drive 34 is used to store data 52 and the programs, including the operating system 46 and application programs 48.

When the computer 20 is turned on or reset, the BIOS 32, which is stored in ROM instructs the processing unit 22 to load the operating system from the hard disk drive 34 into the RAM 30. Once the operating system 46 is loaded into RAM 30, the processing unit executes the operating system code and causes the visual elements associated with the user interface of the operating system to be displayed on the monitor 61. When an application program 48 is opened by a user, the program code and relevant data are read from the hard disk drive and stored in RAM 38.

As is appreciated by those skilled in the art, the World Wide Web (WWW) is a vast collection of interconnected or "hypertext" documents written in HyperText Markup Language (HTML) or other markup languages, that are electronically stored at WWW sites throughout the Internet. A WWW site is a server connected to the Internet that has mass storage facilities for storing hypertext documents and that runs administrative software for handling requests for those stored hypertext documents. A hypertext document normally includes a number of hyperlinks that may be identified in various ways (e.g., highlighted portions of text) which link the document to other hypertext documents possibly stored at a WWW site elsewhere on the Internet. Each hyperlink is associated with a Uniform Resource Locator (URL) and provides the exact location of the linked document on a server connected to the Internet and describes the document. Thus, whenever a hypertext document is retrieved from any WWW server, the document is considered to be retrieved from the WWW. As is known to those skilled in the art, a WWW server may also includes facilities for storing and transmitting application programs, which is application programs written in the JAVA™ programming language from Sun Microsystems, for execution on a remote computer. Likewise a WWW server may also include facilities for executing scripts or other application programs on the WWW server itself.

A consumer or other remote user may retrieve hypertext documents from the WWW via a WWW browser application program. The WWW browser is a software application program for providing a graphical user interface to the WWW. Upon request from the consumer via the WWW browser, the browser accesses and retrieves the desired hypertext document from the appropriate WWW server using the URL for the document and a protocol known as a HyperText Transfer Protocol (HTTP). HTTP is a higher-level protocol than TCP/IP and is designed specifically for the requirements of the WWW. It is used on top of TCP/IP to transfer hypertext documents between servers and clients. The WWW browser may also retrieve application programs from the WWW server, such as JAVA™ applets, for execution on the client computer.

The present application relates to a system and method for facilitating the implementation of a group of actions on multiple computing devices via a single manipulation of a computing device control interface. Specifically, an aspect of the present invention relates to the creation of a graphical icon representative of actions to be executed by a group of servers in an enterprise network. Additionally, another aspect of the present invention relates to the execution of the grouped actions by the group of servers in an enterprise network and the creation of an executable file for repeated execution of the actions by the group of servers and/or the modification actions/group of servers. One skilled in the relevant art will appreciate that the present invention is not limited to its application to server computers in an enterprise network and that the disclosed embodiment should not be construed as limiting.

FIG. 1 is a block diagram illustrative of an enterprise network 70 suitable for implementing a common server control interface in accordance with the present invention. With reference to FIG. 1, the enterprise network 70 includes one or more server control computers 72 for providing a common server control user interface. In an illustrative embodiment of the present invention, a server control computer 72 includes graphical user interface ("GUI") component 74 for providing a server control GUI to capture a set of user specified tasks to be implemented on a set of user specified server computers. The server control computer 72 also includes a template engine component 76 for encoding and transmitting the user specified tasks to the specified group of servers. The server control computer 72 further includes a script engine component 78 for embodying the implementation of the user specified tasks on a group of servers in an executable file. A more detailed description of the GUI component 74, the template engine component 76 and the script engine component 78 will be described below. Although only one server control computer is illustrated, one skilled in the relevant art will appreciate that an enterprise network 70 may include any number of server control computers.

The server control computer 72 is connected via a network connection to a group of server computers. In an illustrative embodiment of the present invention, the server control computer 72 may utilize an external, public network connection, such as the Internet 80. Alternatively, the server control computer may utilize an Intranet, or dedicated external network connection to communicate with the server computers. As illustrated in FIG. 1, an enterprise network can include a collection of server computers, such as database servers 82 ("DS"), application servers 84 ("AS"), and client servers 86("CS"). Each server computer may be connected directly to the network 80. Alternatively, as illustrated in FIG. 1 at 85, one or more server computers may be connected indirectly to the network 80 via another server computer. Additionally, the server computers may be grouped together according to a classification, such as the function of the server computer or the geographic location of the server. Accordingly, the server computers may be geographically remote from one another. One skilled in the relevant art will appreciate, however, that the enterprise network can include additional specialized server computers, or multi-purpose server computers.

In general, the present invention relates to the ability to manage one or more server computer systems in the enterprise network 70 via a centralized user interface provided by a server control computer 72. More specifically, the GUI interface 74 of the server control computer 72 generates a set of graphical icons representative of a group of servers within the enterprise network that will be managed and a set of graphical icons representative of one or more server control parameters, or actions, that are to be executed by each server computer. By selecting a server icon and/or an action icon, a user may implement the actions represented by the selected action icon on each of the servers represented by the selected server icon with a single manipulation of the user interface. Additionally, after the user has manipulated the graphical icons to initiate an action, the central user interface also generates an executable script file including commands embodying the selected actions on the selected servers. Accordingly, the user can repeat the initiation of the action on the servers by saving and re-executing the script file. Moreover, the user can edit the script file with an editing application to modify the action executed and/or the servers.

Figure 2:
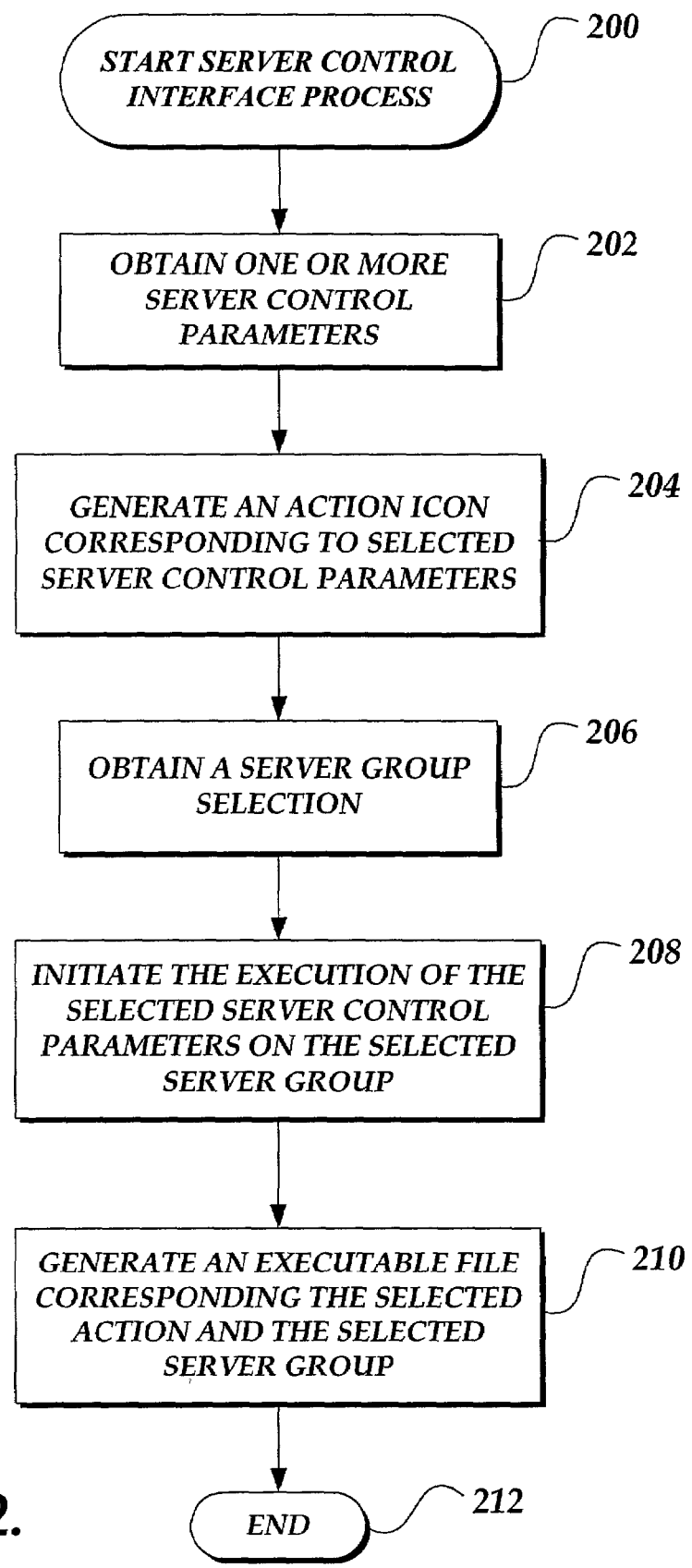
FIG. 2 is a flow diagram illustrative of a server control user interface process implemented by a server control computer in accordance with the present invention.

FIG. 2 is a flow diagram illustrative of a server user interface control process 200 implemented by the server control computer 72 in accordance with the present invention. At block 202, the GUI component 74 of the server control computer 72 obtains a set of server control parameters from the user. In an actual embodiment of the present invention, the GUI component 74 generates one or more graphical windows for obtaining a selection of one or more server control parameters that will be implemented by a number of selected server computers. Accordingly, any one of a variety of input devices/methods may be utilized to obtain the user selections. FIGS. 3-6 are illustrative of a series of screen displays utilized in accordance with the present invention for obtaining a user selection of various server control parameters relating to the collection of performance monitoring data in the selected server computers. One skilled in the relevant art will appreciate that the present invention is not limited in its application to the collection of performance monitoring data. Thus, it is to be understood that the disclosed embodiment is only by way of example and should not be construed as limiting.

Figure 3:
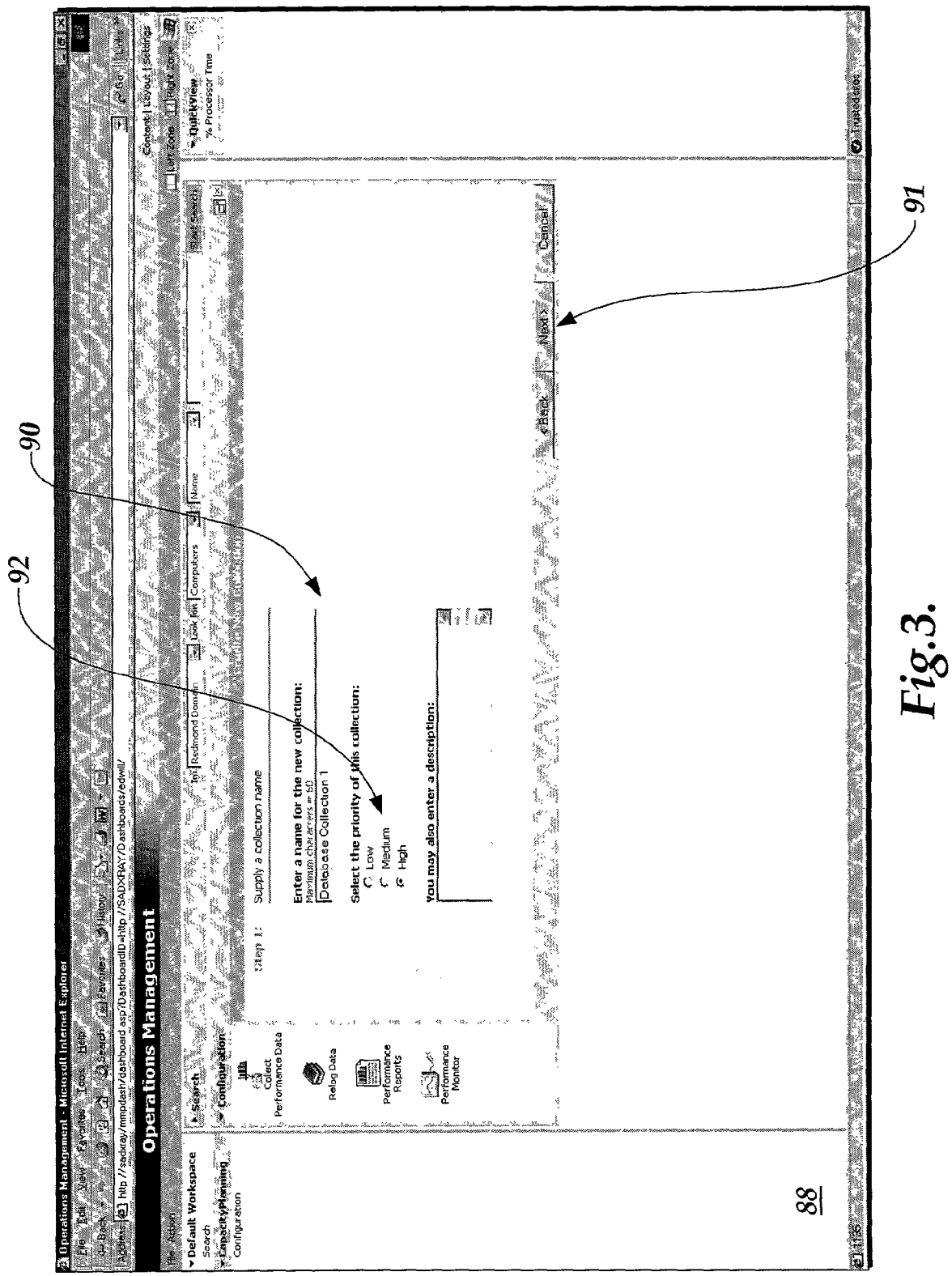
FIG. 3 is an exemplary illustration of a screen display for obtaining server control parameters in accordance with the present invention.

FIG. 3 is an exemplary illustration of a screen display 88 generated by the GUI component 74 for obtaining server control parameters relating to a collection name and collection priority in accordance with the present invention. As illustrated in FIG. 3, the screen display 88 includes a field 90 for designating a name for the set of actions to be grouped. Additionally, the screen display 88 includes a set of controls 90 for establishing a common priority for the actions on each of the servers within the selected group. To enter the server control parameter data, the user manipulates a keyboard, or other text input device, to select a collection name and manipulates a pointing device, such as a mouse, to select a collection priority. In accordance with the present invention, once the name and priority parameters have been specified, the selected parameters will apply to all the servers. By selecting button 91, the user proceeds to the next screen display.

Figure 4:
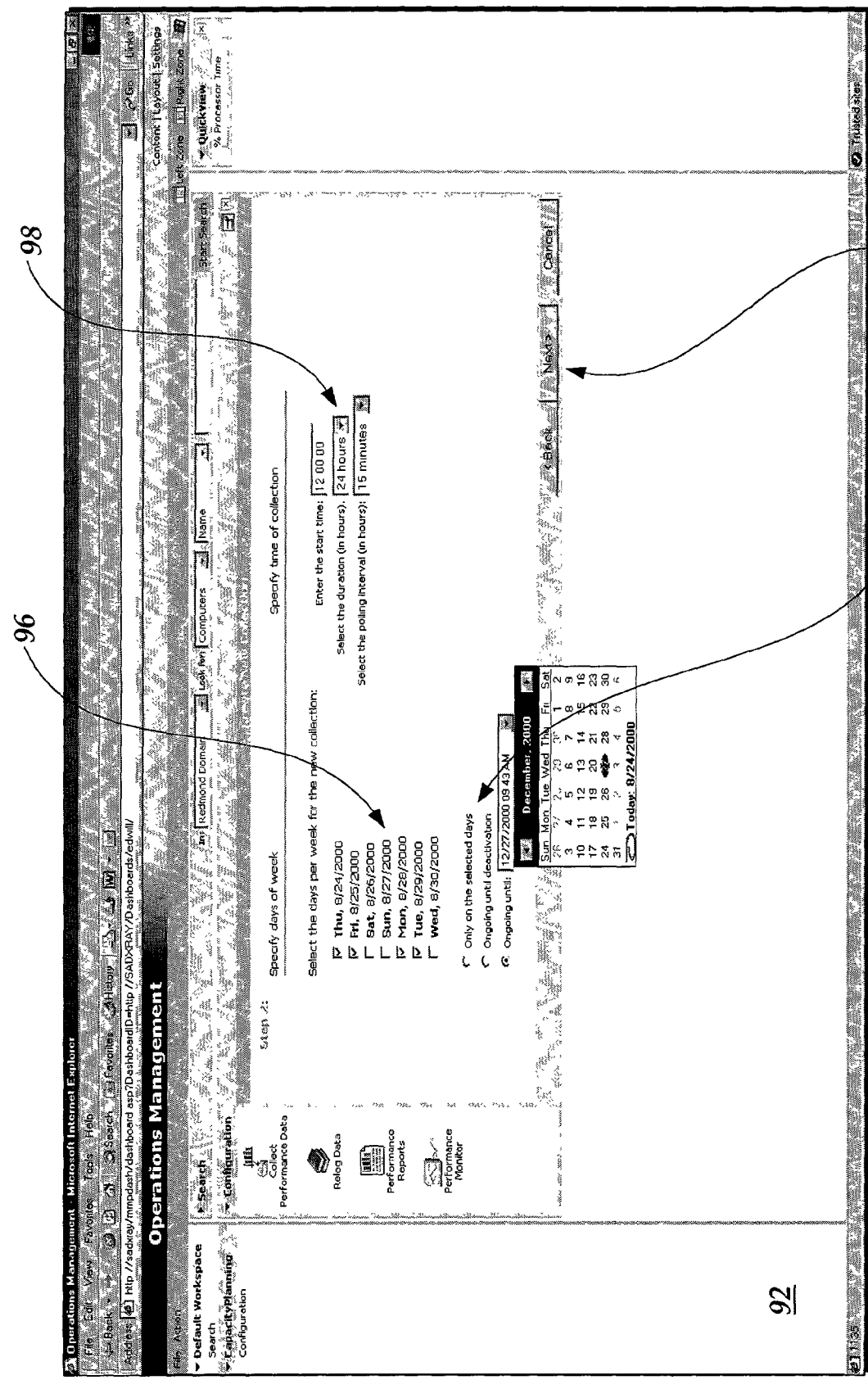
FIG. 4 is an exemplary illustration of a screen display for obtaining server control parameters in accordance with the present invention.

FIG. 4 is an exemplary illustration of a screen display 92 generated by the GUI component 74 for obtaining control parameters relating to the specification of a collection time in accordance with the present invention. The screen display 92 includes various controls 94 for specifying time functions relating to the user-selected tasks. In an actual embodiment of the present invention, the controls 94 include a set of controls 96 for selecting the days of the week the performance monitoring data are to be collected, a set of controls 98 for selecting start times and duration of the performance monitoring, and a set of controls 100 for specifying a termination date for the collection. In this illustrative screen display 92, the user makes the selection of server control parameters by manipulating pull-down menus 100 and selecting specific days of the week 96 with a pointing device and/or entering a specific start time 98 with a keyboard input device. One skilled in the relevant art will appreciate that alternative or additional fields/displays may be practiced with the present invention. By selecting button 91, the user proceeds to the next screen display.

Figure 5:
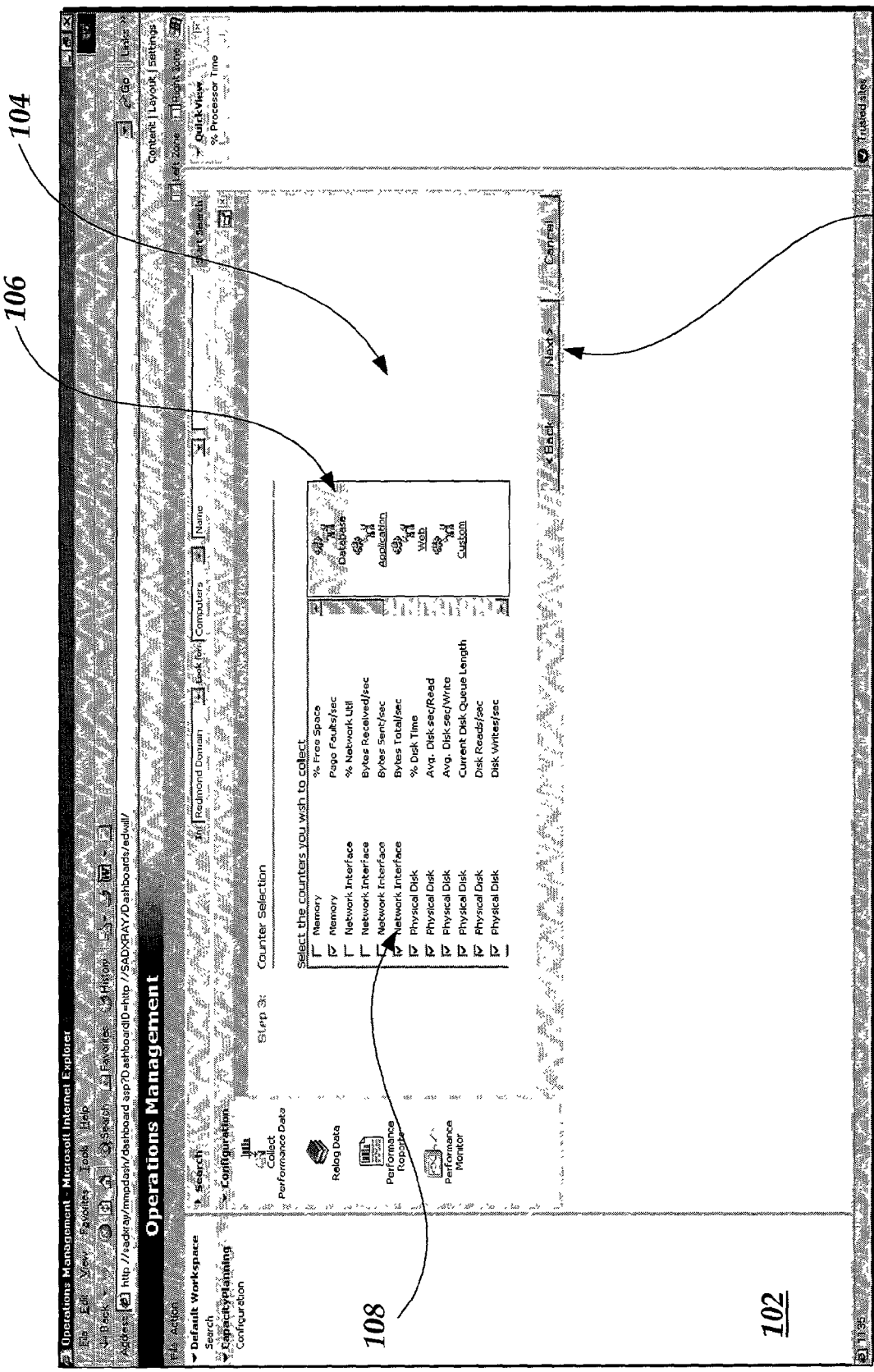
FIG. 5 is an exemplary illustration of a screen display for obtaining server control parameters in accordance with the present invention.

FIG. 5 is an exemplary illustration of a screen display 102 generated by the GUI component 74 for obtaining control parameters relating to the collection of specific performance monitoring data from the selected server computers in accordance with the present invention. The screen display 102 includes a set of controls 104 for selecting components of each server to be measured. In an illustrative embodiment of the present invention, the controls 104 include a server computer grouping control 106 for selection of one or more pre-selected groups of servers, such as the database servers, application servers or webs servers. Additionally, the controls 104 include a control 108 for selecting specific counters to be measured within each selected server. As illustrated in FIG. 5, each pre-selected group of servers may have specific counters that relate to their designated function within the enterprise network as applied to the collection of capacity planning data. For example, the selection of the database server group causes the GUI component 74 to display a pre-determined list 108 of server counters applicable to monitoring database performance. Accordingly, the user can select which of the applicable counters will be measured by selecting individual counters with a pointing device. In an alternative embodiment, a user may also create an action icon by manually entering software code, such as VB script commands, that result in the desired action. The user's code would then be represented as an action icon on the display screen. Similar to the previous display screens, the selection of the counters in screen display 102 will be applied to each server represented by the selected server icon. By selecting button 91, the user proceeds to the next screen display 102.

Figure 6:
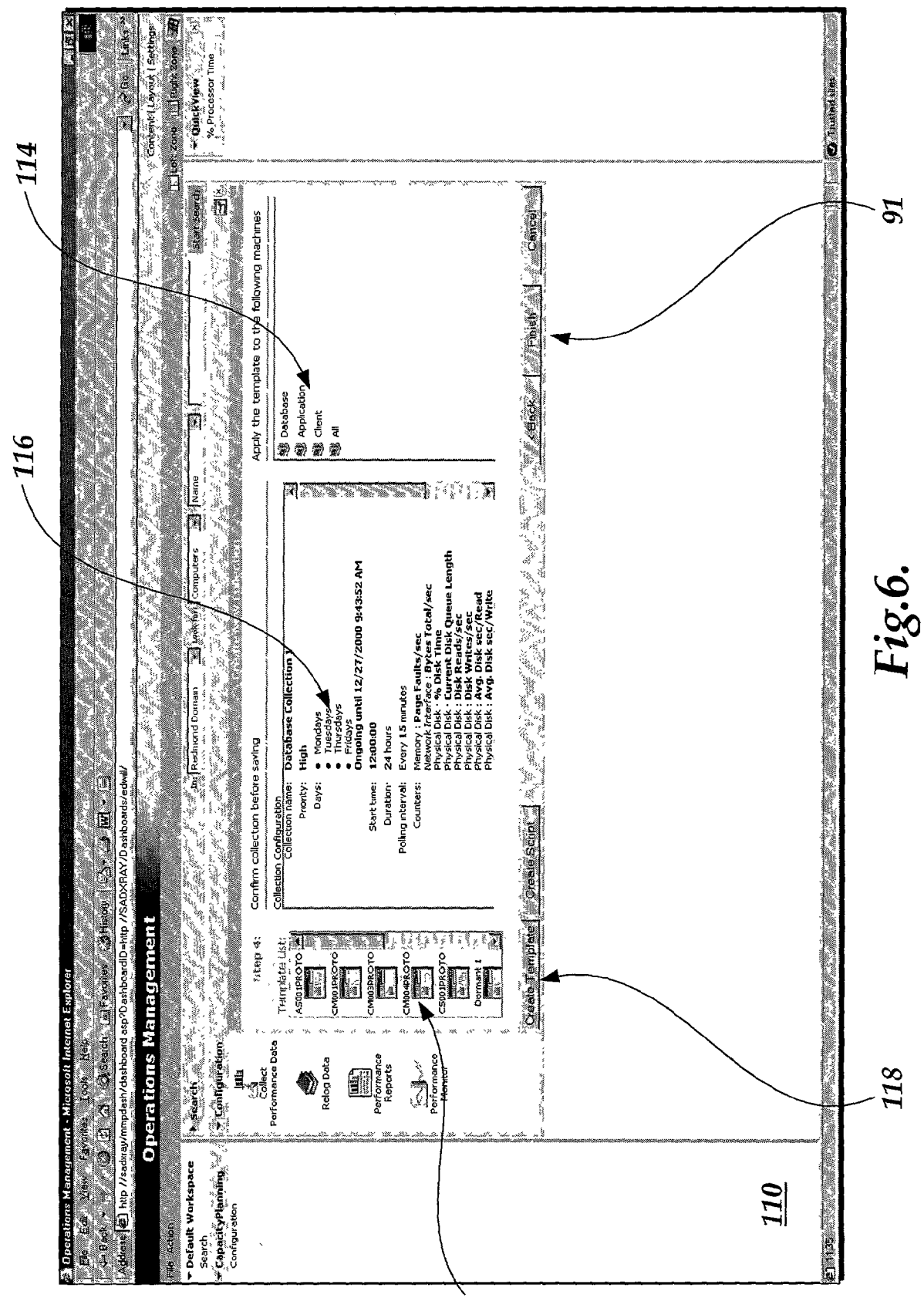
FIG. 6 is an exemplary illustration for confirming the selection of the server control parameters in accordance with the present invention.

FIG. 6 is an exemplary illustration of a screen display 110 generated by the GUI component 74 for confirming the user selected control parameters relating to the collection of performance monitoring data in accordance with the present invention. The screen display 110 includes a display of previously configured action icons 112 and a display of previously configured grouped servers 114. The function of the previously configured action icons 112 and the grouped servers 114 will be explained in greater detail below. The screen display 110 also includes a display of the currently selected parameters 116. Because a user may have to manipulate various screens to complete the selection process, the screen display 110 provides a mechanism to view all the selected server control parameters before proceeding with the routine 200. The user indicates the completion of the selection process by selecting button 118, as will be explained below.

Figure 7:
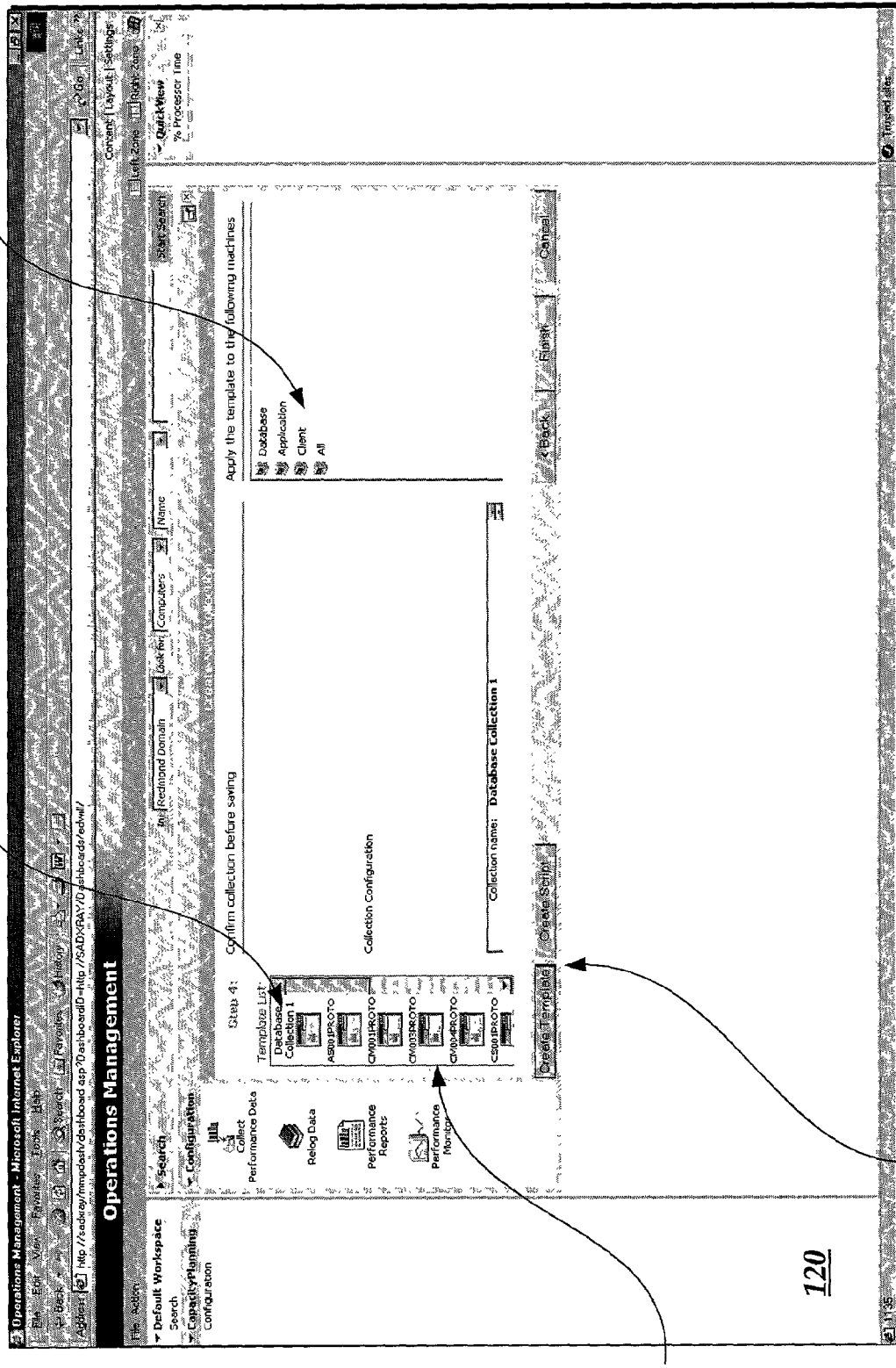
FIG. 7 is an exemplary illustration for obtaining a user indication of a set of actions to be performed on a group of server computers in accordance with the present invention.

Returning to FIG. 2, at block 204, once the system administrator has obtained and confirmed the user selection of the server control parameters, at block 204, the GUI component 74 generates an action icon corresponding to the selected server control parameters. FIG. 7 is an exemplary illustration of a screen display 120 for displaying the user selecting control parameters as an action icon in accordance with the present invention. The screen display 120 is similar to screen display 110 by including a display of all the previously grouped control parameters 122 and a display of the all the grouped servers 124. However, screen display 120 includes a new action icon 126 corresponding to the selected control parameters. Accordingly, the GUI component 74 has embodied the previously selected server control parameters into a single action icon 126. One skilled in the relevant art will appreciate that action icon 126 may be saved by the GUI component 74 and re-utilized by the user. Additionally, the GUI component 74 may include a number of pre-configured action icon groupings provided by the software provider. For example, the software provider may include action icons corresponding to specific operating system platforms and versions or for specific enterprise network configurations. Thus, the user may either utilize the pre-configured action icons or modify the pre-configured icons to suit the specific network.

With reference once again to FIG. 2, at block 206, the GUI component 74 obtains a server group selection for the purpose of initiating a selected set of actions on the selected server group. In an actual embodiment of the present invention, the GUI component may be pre-configured with specific server groupings, such as the database servers, the application servers, or all the servers. Alternatively, the user may traverse one or more display screens to select a specific set of servers, such as according to geographic location. Additionally, the user may be able to repudiate one or more servers that would generally be included in the grouping. In an illustrative embodiment of the present invention, the selection of which servers will be included in the server group may also be based on the satisfaction of any one of a variety of server property criteria. For example, a user may indicate that the server group be limited to servers running a specific version of an operating system. Accordingly, the server control computer 72 could either configure which servers belong to the group at startup, or alternatively, upon deployment of an action.

Figure 8:
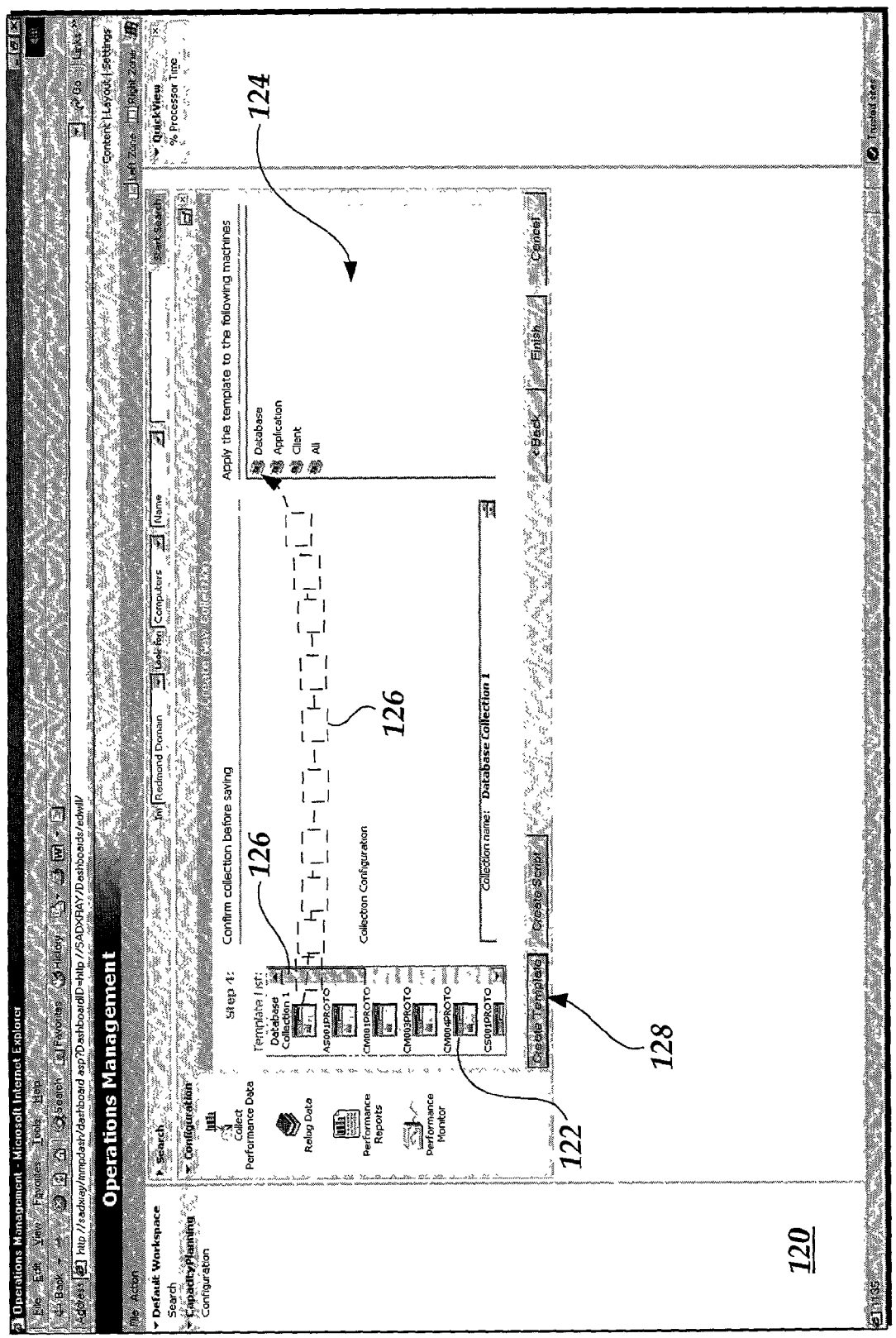
FIG. 8 is an exemplary screen display illustrating a drag and drop technique for manipulating a graphical icon in accordance with the present invention.

To complete the initiation, the user manipulates the desired action icon with a graphical interface device, such as a mouse, for the purpose of depositing it on the selected server icon. Specifically, the user utilizes a "drag and drop" technique in which the action icon is selected, moved across the screen display until it overlaps the desired server group and then deselected. FIG. 8 is exemplary of the screen display 120 of FIG. 7 illustrating the graphical manipulation of the action icon 126 to a selected server grouping icon. Drag and drop techniques are well known in the relevant art and will not be discussed in further detail. One skilled in the relevant art will appreciate that alternative methods for selecting a server icon may be practiced with the present invention, including the selection of a server icon and drag and dropping it on the selected action icon.

At block 208, the template engine 76 of the server control computer 72 initiates the performance of the selected actions embodied in the action by the group of servers embodied in the server icon. In addition to selecting the server group, in the illustrative embodiment, the drag and drop of the action icon over the server group icon automatically initiates the performance of the action on the group of servers. Alternatively, the action may be initiated by including one or more controls in a screen display 120 (FIG. 7), such as a confirmation window or a "start" button. Alternatively, the GUI component 74 may also include one or more screen displays that allow a user to schedule the initiation of the selected actions at a later date. In this alternative embodiment, the GUI component 74 allows the user to select an action icon and a server icon and a corresponding schedule in which to implement the selected action on the selected group of servers.

With reference to the collection template embodiment, the template engine 76 initiates the selected actions on the selected group of servers by issuing a template to each server over the enterprise network. With reference to the above example, the template engine 76 issues a collection template to each server in the selected group. In an actual embodiment of the present invention, the present invention utilizes Web-Base Enterprise Management ("WBEM") interface components to initiate the actions on the selected servers. One skilled in the art will appreciate that the WBEM initiative is based on a set of management and Internet standard technologies developed to unify the management of enterprise computing environments, and it provides the ability to deliver a set of standard-based management tools leveraging technologies such as common information model ("CIM") and extensible markup language ("XML"). One example of a WBEM-compliant interface, which can be utilized by the present invention, is Microsoft Corporation's windows management instrumentation ("WMI"). One skilled in the relevant art, however, will appreciate that alternative or additional protocols may be utilized with the present invention.

Once the action has been initiated, at block 210, the system administrator can request for the generation of an archive file for storing the actions executed by the selected server group. In an actual embodiment of the present invention, the archive files is in the form of an executable file that instigates the selected actions on the selected servers when executed. Alternatively, the archive file may be an XML-based description that could then be applied to the target server by another deployment tool. With reference to screen display 122 (FIG. 7), a control 128 is provided to obtain a system administrator request for the generation of an archive file. In an actual embodiment of the present invention, the script engine 78 of the server control computer 72 generates the archive file in the form of a script file encoded in a scriptable language, such as Microsoft Corporation's VB Script scriptable language, embodying the execution of the selected actions on the selected group of servers. The script file can be saved and/or edited for future use. One skilled in the relevant art will appreciate that any one of a variety of alternative executable files may be utilized with the present invention.

Generally described, the script file generated by the script engine 78 includes the individual commands for initiating each selected action on each server in the selected group. Accordingly, in the event the system administrator wishes to reinitiate the specific action on the selected group of servers, the server control computer 72 accesses the saved script file and the actions are re-executed. Additionally, as will be readily understood by one skilled in the art, the script file may be editing utilizing a standard text editing program to modify the selected actions and/or to add or remove servers from the selected group of servers.

Once the script engine 78 has generated the script file, the system administrator does not need to repeat the parameter selection process embodied in blocks 202-206 to re-implement the selected actions. Moreover, once one or more action icons have been created and saved, the actions may be implemented on any of the server groups displayed on the screen display 120 (FIG. 7) without repeating the process embodied in blocks 202-206. Returning to FIG. 2, at block 212, the process 200 terminates. The present invention facilitates the implementation of one or more actions, such as capacity planning data collection, on multiple servers by a single manipulation of the user interface. Additionally, the present invention facilitates the repeated implementation and/or modification of previously selected action by utilizing a modifiable executable file. One skilled in the relevant art will further appreciate that the present invention mitigates the need for a system administrator to dedicate a great deal of time to hand generate a single script file capable of implementing one or more selected actions of a number of servers.

While an illustrative embodiment of the invention has been illustrated and described, it will be appreciated that various changes can be made therein without departing from the spirit and scope of the invention.

The embodiments of the invention in which an exclusive property or privilege is claimed are defined as follows:

1. A method of providing a computing device control interface for centrally controlling a plurality of networked computing devices, the method comprising:
    displaying a number of actions to be executed on one or more counters related to specific functions of a number of networked computing devices, the counters chosen from a set of counters, the choice based on a designated role of the networked computing devices in an enterprise network;
    obtaining a user selection of the number of actions;
    generating an action icon representing a control of the user-selected number of actions;
    displaying a set of graphical action icons for selection by a user, wherein each action icon represents a control to one or more actions to be executed on one or more counters of one or more computing devices;
    displaying a set of graphical computing device icons wherein each graphical computing device icon represents a control to one or more networked computing devices;
    obtaining a selection of initializing the one or more actions controlled by a graphical action icon;
    obtaining a selection of initializing the one or more networked computing devices controlled by a graphical computing device icon; and
    instructing the one or more actions controlled by the selected graphical action icon to execute on the one or more counters of each networked computing device controlled by the selected graphical computing device icon.

2. The method as recited in claim 1, further comprising generating an archive file for storing a number of actions controlled by the graphical action icon, wherein execution of the archive file causes the execution of the number of actions in the archive file on the one or more counters of the one or more networked computing devices controlled by the selected graphical computing device icon.

3. The method as recited in claim 2, wherein the archive file is a script file.

4. The method as recited in claim 2, further comprising executing the number of actions in the archive file without repeatedly obtaining the number of actions to be executed on the one or more counters of the one or more networked computing devices controlled by the selected graphical computing device icon.

5. The method as recited in claim 4, further comprising obtaining user input for editing the actions stored in the archive file before executing the actions on the one or more counters of the one or more networked computing devices controlled by the selected graphical computing device icon.

6. The method as recited in claim 1, wherein at least one graphical action icon in the set of graphical action icons implements a collection template for capacity planning in the one or more networked computing devices controlled by the selected graphical computing device icon.

7. The method as recited in claim 1, wherein at least one graphical action icon in the set of graphical action icons assigns a common priority for the corresponding action on each networked computing device controlled by the selected graphical computing device icon.

8. The method as recited in claim 1, wherein the networked computing device is a server computer in an enterprise network.

9. A tangible computer-readable storage medium having computer-executable instructions for performing the method recited in claim 1.

10. A computer system having a processor, a memory and an operating environment, the computer system operable for performing the method recited in claim 1.

11. In a computer system having a display and at least one graphical user interface selection device, a method of providing a centralized server control interface for executing a group of actions concurrently on a group of networked computing devices, the method comprising:

displaying a number of actions to be executed on counters related to specific functions of a group of networked computing devices, the counters chosen from a set of counters, the choice based on a designated role of the networked computing devices in an enterprise network;

obtaining a user selection of the number of actions;

displaying the group of actions as an action icon on the display;

obtaining an identification of a group of networked computing devices on which to execute the group of actions;

displaying the group of networked computing devices as a computing device icon on the display;

obtaining a selection of the action icon by the graphical user interface selection device; and instructing the group of actions displayed as the selected action icon to execute on the group of networked computing devices displayed as the computing device icon upon manipulating the selected action icon to overlap on the computing device icon.

12. The method as recited in claim 11, further comprising generating an archive file to store the group of actions displayed as the action icon.

13. The method as recited in claim 12, wherein the archive file is a script file.

14. The method as recited in claim 12, further comprising:

displaying an input area on the display for obtaining a user selection of an executable file created from the archive file; and instructing the group of actions in the executable file to execute, without repeatedly obtaining the identification of the group of actions, on the counters related to specific functions of the group of networked computing devices.

15. The method as recited in claim 11, wherein the graphical user interface selection device is a mouse.

16. The method as recited in claim 11, wherein a networked computing device is a server computer in an enterprise network.

17. A tangible computer-readable storage medium having computer-executable instructions for performing the method recited in claim 11.

18. A method of providing a server control interface for centrally controlling a plurality of networked servers, the method comprising:

displaying a number of actions to be executed on one or more counters, the counters chosen from a set of counters, the choice based on a designated role of the networked servers in an enterprise network;

obtaining a user selection of the number of action;

generating an action icon representing a control of the user-selected number of actions;

displaying a set of graphical action icons for selection by a user, wherein each action icon represents a control to one or more actions to be executed by one or more networked servers, and wherein at least one graphical action icon in the set of graphical action icons includes an action to implement a collection template for capacity planning;

displaying a set of graphical server icons wherein each graphical server icon represents a control to one or more networked servers;

obtaining a selection of initializing the one or more actions controlled by a graphical action icon;

obtaining a selection of initializing the one or more networked servers controlled by a graphical server icon; and instructing the one or more actions controlled by the selected graphical action icon to execute on the one or more counters of each networked server controlled by the selected graphical server icon.

19. The method as recited in claim 18, further comprising generating an archive file for storing a number of actions controlled by the graphical action icon, wherein execution of the archive file causes the execution of the number of actions in the archive file on the one or more counters of the one or more networked servers controlled by the selected graphical server icon.

20. The method as recited in claim 19, wherein the archive file is a script file.

* * * * *